US008920282B2

(12) United States Patent
Ari et al.

(10) Patent No.: US 8,920,282 B2
(45) **Date of Patent: *Dec. 30, 2014**

(54) TRANSMISSION WITH A COMMON ACTUATOR FOR TWO CLUTCHES

(75) Inventors: Vural Ari, Wooster, OH (US); Scott Strong, Wooster, OH (US); Todd J. Sturgin, Shreve, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 311 days.

This patent is subject to a terminal disclaimer.

(21) Appl. No.: 13/398,014

(22) Filed: Feb. 16, 2012

(65) Prior Publication Data

US 2012/0217114 A1 Aug. 30, 2012

Related U.S. Application Data

(60) Provisional application No. 61/446,549, filed on Feb. 25, 2011.

(51) Int. Cl.

| | |
|---|---|
| ***F16H 3/44*** | (2006.01) |
| ***F16D 27/12*** | (2006.01) |
| ***F16D 23/12*** | (2006.01) |
| ***F16D 25/10*** | (2006.01) |

(52) U.S. Cl.

CPC ................ *F16D 27/12* (2013.01); *F16D 23/12* (2013.01); *F16D 25/10* (2013.01); *F16D 2023/123* (2013.01)

USPC .......................................... 475/321; 475/331

(58) Field of Classification Search

USPC ........ 475/317, 320–322, 331; 192/48.9, 48.8, 192/48.619

See application file for complete search history.

(56) References Cited

U.S. PATENT DOCUMENTS

| | | | | |
|---|---|---|---|---|
| 2,225,939 A | | 12/1940 | Baer | |
| 3,738,461 A | | 6/1973 | Brooks et al. | |
| 4,414,862 A | * | 11/1983 | Svab | 475/146 |
| 5,531,651 A | * | 7/1996 | Yang | 475/12 |
| 6,086,504 A | * | 7/2000 | Illerhaus | 475/347 |
| 6,540,638 B2 | * | 4/2003 | Sulzmann | 475/210 |
| 6,612,961 B2 | * | 9/2003 | Ohkubo et al. | 475/319 |
| 6,685,595 B2 | * | 2/2004 | Ohkubo et al. | 475/319 |
| 7,247,114 B2 | * | 7/2007 | Kaneda et al. | 475/116 |
| 2003/0089569 A1 | * | 5/2003 | Antonov et al. | 192/48.92 |
| 2003/0190993 A1 | * | 10/2003 | Ohkubo et al. | 475/317 |
| 2005/0205378 A1 | * | 9/2005 | Miyazaki et al. | 192/48.8 |
| 2012/0214639 A1 | * | 8/2012 | Davis et al. | 475/323 |

* cited by examiner

*Primary Examiner* — Justin Holmes

(74) *Attorney, Agent, or Firm* — Simpson & Simpson, PLLC

(57) ABSTRACT

A clutch assembly for a transmission, including: first and second clutches; and an actuation assembly including an actuator for engaging the first and second clutches. The first clutch is arranged to be connected to a planet carrier for a planetary gear set for the transmission so that the planet carrier and a first portion of the first clutch rotate in unison. The first clutch is arranged to be connected to an output shaft for the transmission so that a second portion of the first clutch and the output shaft rotate in unison. The second clutch is arranged to be connected to a ring gear for the planetary gear set so that the ring gear and a portion of the second clutch rotate in unison.

9 Claims, 6 Drawing Sheets

D1
D2
101
100
122
120
108
102
104
106
156
152
118
158
152

TRANSMISSION WITH A COMMON ACTUATOR FOR TWO CLUTCHES

CROSS-REFERENCE TO RELATED APPLICATIONS

This application claims the benefit under 35 U.S. §119(e) of U.S. Provisional Patent Application No. 61/446,549 filed Feb. 25, 2011 which application is incorporated herein by reference.

TECHNICAL FIELD

The present disclosure relates to a clutch assembly, in particular, a clutch assembly in a transmission, and more particularly for a transmission for a hybrid vehicle. A single actuator is used to operate the clutch assembly. One of the clutches closes for failure of the actuator.

BACKGROUND

It is known to use hydraulic pressure systems to operate clutch plates in a transmission. This type of hydraulic pressure system may entail undesirably high power requirements, since a pump must be continuously operated to maintain adequate pressure in the fluid circuits of a hydraulic system to counter leakage through dynamic seals.

SUMMARY

According to aspects illustrated herein, there is provided a clutch assembly for a transmission, including: first and second clutches; and an actuation assembly including: an actuator; and at least one spring. The first clutch is arranged to be connected to a planet carrier for a planetary gear set for the transmission so that the planet carrier and a portion of the first clutch rotate in unison. The first clutch is arranged to be connected to an output shaft for the transmission so that the portion of the first clutch and the output shaft rotate in unison. The second clutch is arranged to be connected to a ring gear for the planetary gear set so that the ring gear and a portion of the second clutch rotate in unison. For a power failure of the actuator, the at least one spring is arranged to close the first clutch.

According to aspects illustrated herein, there is provided a clutch assembly for a transmission, including: a first clutch arranged to be connected to a planetary gear set for the transmission and to a first input shaft for the transmission and including a first plurality of clutch plates; a second clutch arranged to be connected to the planetary gear set; and an actuation assembly including at least one spring, and an actuator with a displaceable portion for engaging the first and second clutches. In a first position for the displaceable portion of the actuator: pre-loading of the at least one spring creates a first force urging the first clutch closed; the second clutch is open; and a first torque path is formed from the first input shaft to an output shaft for the transmission through the first plurality of clutch plates. In a second position for the displaceable portion of the actuator: the displaceable portion is arranged to: close the second clutch; and displace at least a portion of the at least one spring to counteract the first force to open the first clutch. A second torque path is formed from a second input shaft for the transmission to the output shaft via the planetary gear set and a portion of the first clutch.

According to aspects illustrated herein, there is provided a clutch assembly for a transmission, including: first and second clutches; and an actuation assembly including an actuator for engaging the first and second clutches, a plate, and a plurality of springs. The first clutch is arranged to be connected to a planet carrier for a planetary gear set for the transmission so that the planet carrier and a first portion of the first clutch rotate in unison. The first clutch is arranged to be connected to an output shaft for the transmission so that the output shaft and a second portion of the first clutch rotate in unison. The second clutch is arranged to be connected to a ring gear for the planetary gear set so that the ring gear and a portion of the second clutch rotate in unison. In a first mode, a portion of the actuator is arranged to axially displace at least a portion of a first spring from the plurality of springs in a first axial direction such that the displacement of the first spring displaces the plate to: close the second clutch; and displace at least one second spring from the plurality of springs to open the first clutch. In a second mode, a portion of the actuator is arranged to axially displace to enable displacement of the first spring in a second axial direction, opposite the first axial direction: to open the second clutch; and such that the at least one second spring closes the first clutch.

According to aspects illustrated herein, there is provided a clutch assembly for a transmission, including: first and second clutches; and an actuation assembly including an actuator for engaging the first and second clutches, a spring, first and second plates, and a separating element. The first clutch is arranged to be connected to a planet carrier for a planetary gear set for the transmission so that the planet carrier and a first portion of the first clutch rotate in unison. The first clutch is arranged to be connected to an output shaft for the transmission so that the output shaft and a second portion of the first clutch rotate in unison. The second clutch is arranged to be connected to a ring gear for the planetary gear set so that the ring gear and a portion of the second clutch rotate in unison. In a first mode, the separating element is radially displaceable by the actuator to: apply a first force to the first plate to close the second clutch; and apply a second force to the second plate to displace the spring and open the first clutch. In a second mode, the separating element is radially displaceable by the actuator: to open the second clutch; and so that the spring urges the first clutch closed.

According to aspects illustrated herein, there is provided a clutch assembly for the transmission, including: first and second clutches; and an actuation assembly including: an actuator for engaging the first and second clutches; first and second discs; and a third disc axially disposed between the first and second discs. The first clutch is arranged to be connected to a planet carrier for a planetary gear set for the transmission so that the planet carrier and a first portion of the first clutch rotate in unison. The first clutch is arranged to be connected to an output shaft for the transmission so that the output shaft and a second portion of the first clutch rotate in unison. The second clutch is arranged to be connected to a ring gear for the planetary gear set so that the ring gear and a portion of the second clutch rotate in unison. In a first mode the third disc is displaceable by the actuator in a first circumferential direction to: disengage the second and third discs to open the second clutch; and engage the first disc to axially displace the first disc in a first axial direction to close the first clutch. In a second mode: the third disc is displaceable by the actuator in a second circumferential direction, opposite the first circumferential direction, to engage the second disc to axially displace the second disc in a second axial direction, opposite the first axial direction, so that the second disc closes the second clutch; and the third disc urges the at least one spring in the second circumferential direction to open the first clutch.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
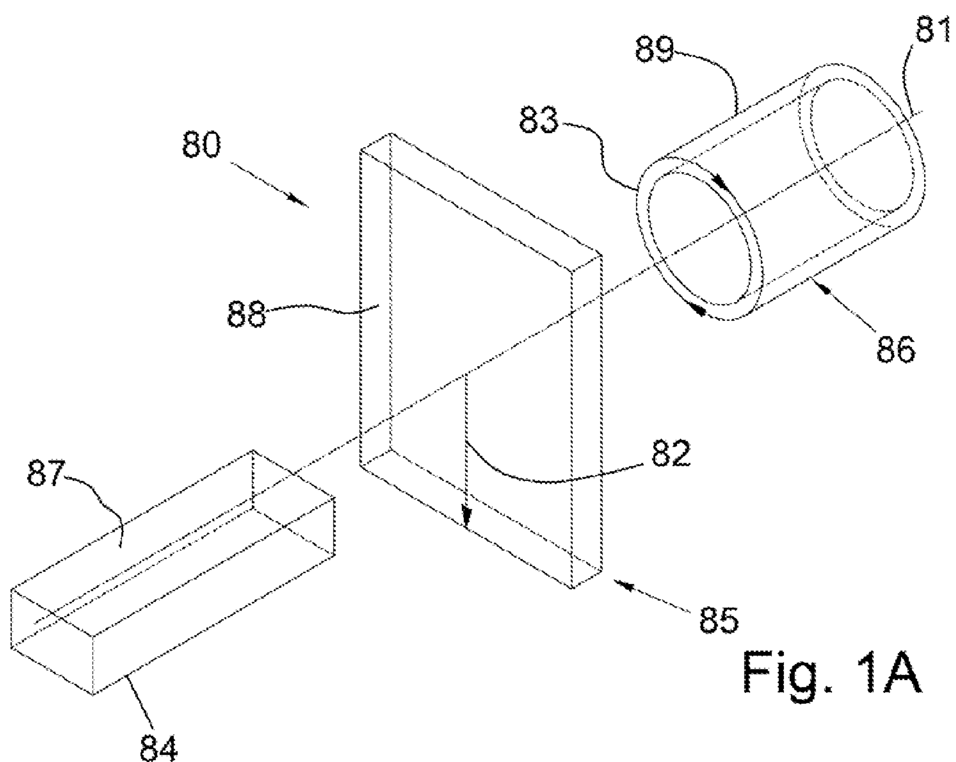
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives “axial,” “radial,” and “circumferential” are with respect to an orientation parallel to axis 81, radius 82 (which is orthogonal to axis 81), and circumference 83, respectively. The adjectives “axial,” “radial” and “circumferential” also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs “axially,” “radially,” and “circumferentially” are with respect to an orientation parallel to axis 81, radius 82, or circumference 83, respectively. The adverbs “axially,” “radially,” and “circumferentially” also are regarding orientation parallel to respective planes.

Figure 1B:
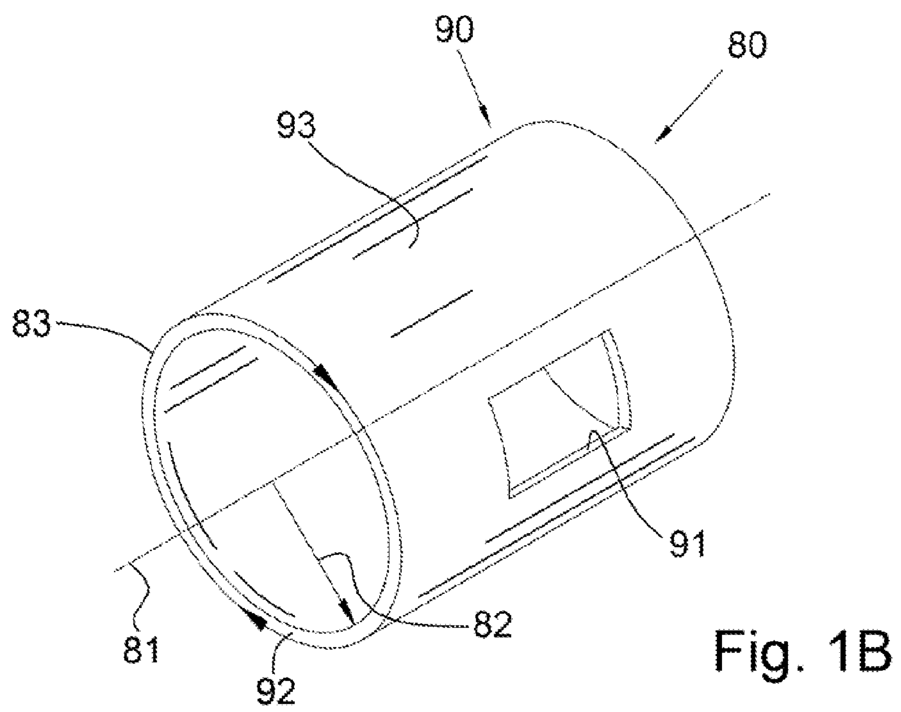
FIG. 1B is a perspective view of an object in the cylindrical coordinate system of FIG. 1A demonstrating spatial terminology used in the present application; and, FIG. 2A is a schematic cross-section of a clutch assembly, with a common actuator for two clutches and a fail close clutch, for a transmission.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2A:
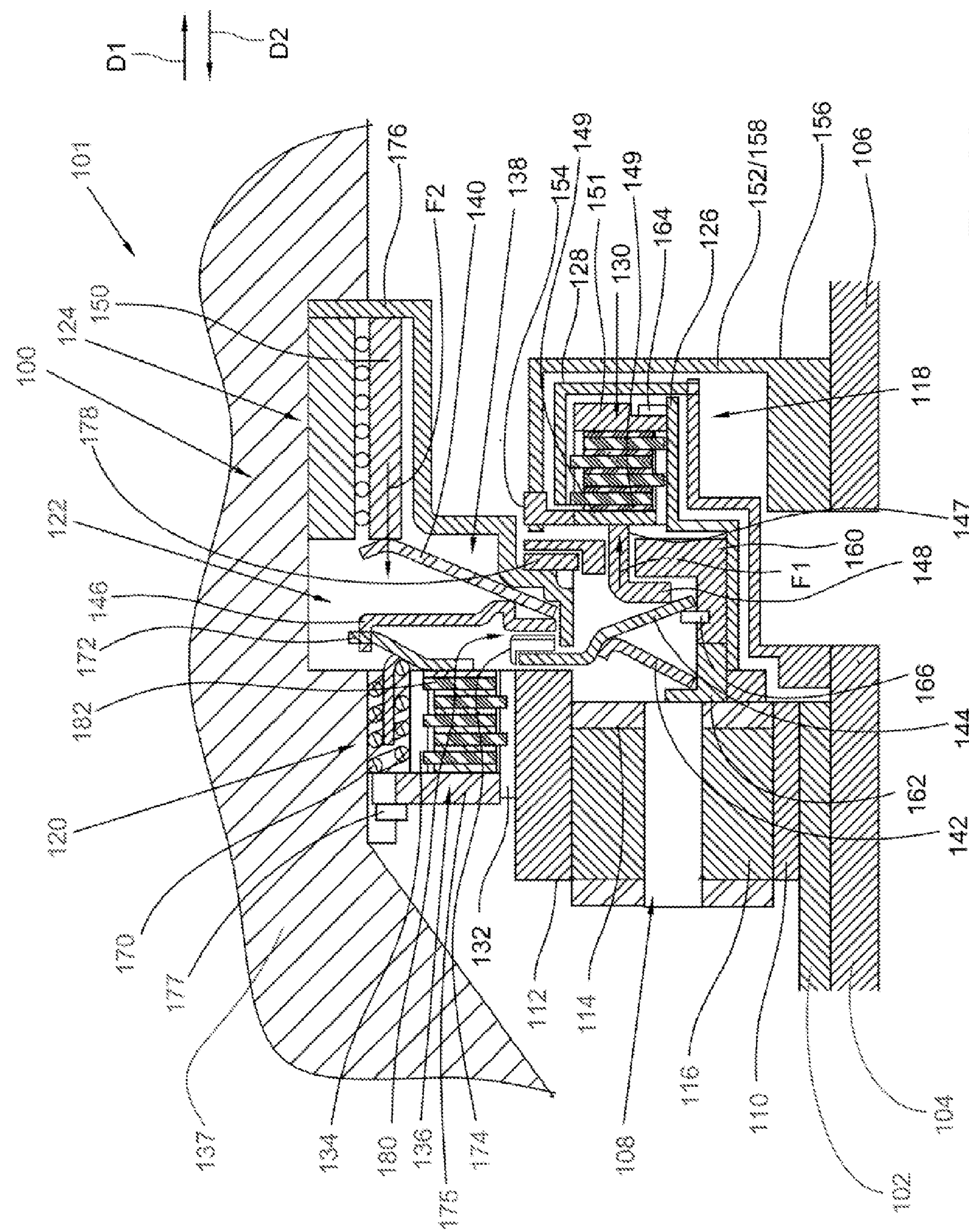
FIG. 2B is a schematic cross-section of the clutch assembly shown in FIG. 2A, illustrating torque paths.

FIG. 2A is a schematic cross-section of clutch assembly 100, with a common actuator for two clutches and a fail close clutch, for a transmission.

Figure 2B:
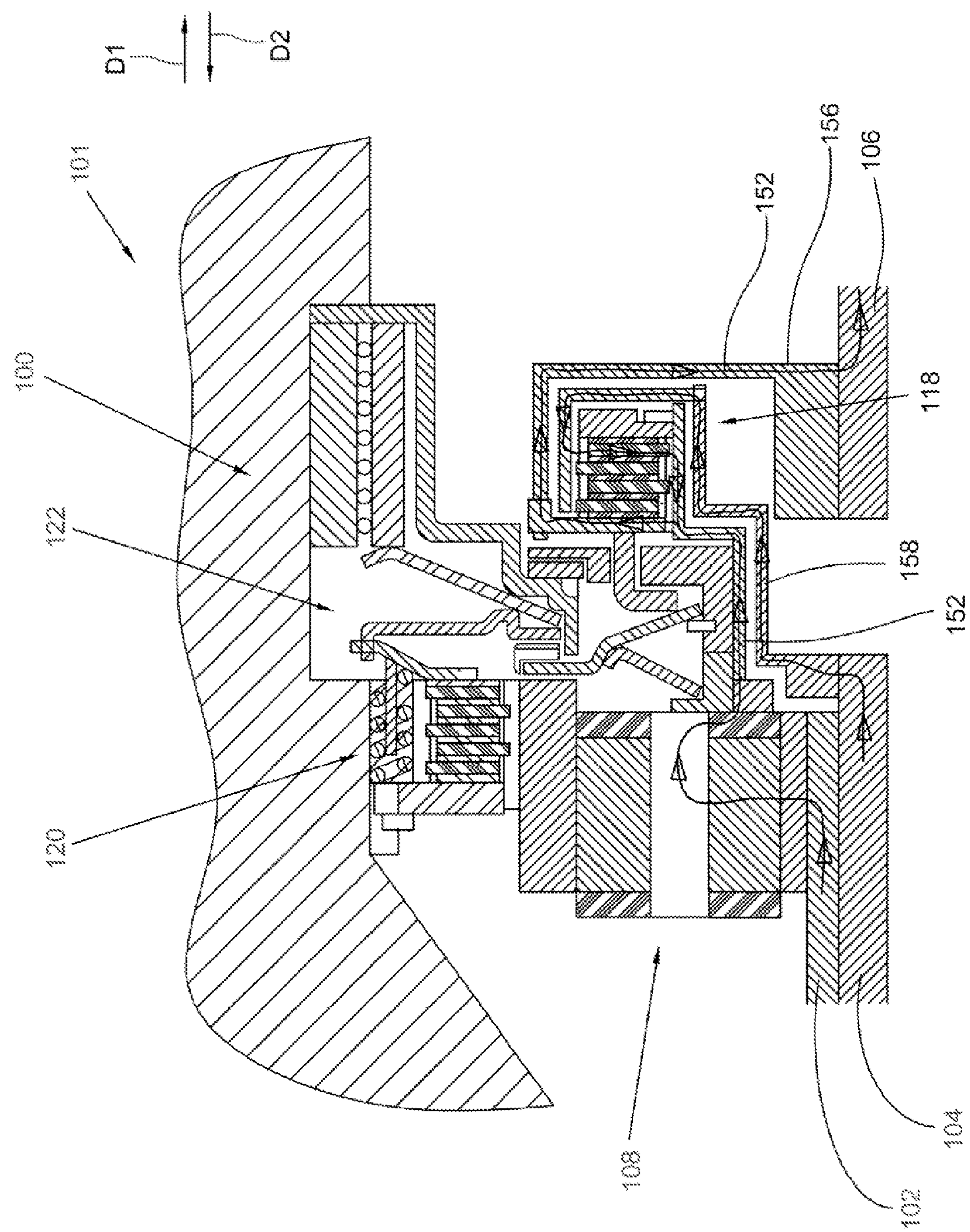

FIG. 2B is a schematic cross-section of clutch assembly 100 shown in FIG. 2A, illustrating torque paths. The following should be viewed in light of FIGS. 2A and 2B. Transmission 101 includes input shafts 102 and 104, output shaft 106, and planetary gear set 108. In an example embodiment, gear set 108 includes sun gear 110 connected to input shaft 102, ring gear 112, and planet carrier 114 connected to a plurality of planet gears 116. In an example embodiment, the sun gear is connected to input shaft 102 so that the sun gear and input shaft 102 rotate in unison. The clutch assembly includes clutches 118 and 120 and actuation assembly 122 including actuator 124. Actuator 124 can be any actuator known in the art, including, but not limited to an electro-mechanical actuator, a pneumatic actuator, a hydraulic actuator, or a vacuum actuator. In an example embodiment, the actuator is an electro-mechanical actuator.

By “rotate in unison” we mean that the sun gear and input shaft 102 are connected so that if one of the sun gear or input shaft 102 rotates, the other of the sun gear or input shaft 102 must necessarily rotate. That is, rotation of one of the sun gear or input shaft 102 is not possible without rotation of the other of the sun gear or input shaft 102. Note that axial movement between the sun gear and input shaft 102 is possible. The preceding explanation is applicable to the use of “rotate in unison” in the discussion that follows.

The planet carrier is connected to clutch 118 so that the planet carrier and at least a portion of the clutch 118 rotate in unison. Clutch 118 is connected to the output shaft. Clutch 118 includes inner carrier 126, outer carrier 128, and a plurality of clutch plates 130 disposed radially between the inner and outer carriers. In an example embodiment, the planet carrier is connected to inner carrier 126 so that the planet carrier and inner carrier 126 rotate in unison.

Clutch 120 includes inner carrier 132, outer carrier 134, and a plurality of clutch plates 136 disposed radially between the inner and outer carriers. In an example embodiment, the ring gear is connected to inner carrier 132 so that the ring gear and inner carrier 132 rotate in unison. In an example embodiment, outer carrier 134 is grounded to casing 137 of the transmission. That is, outer carrier 134 is connected to the casing so that rotation of outer carrier 134 with respect to the casing is not possible except possibly within tolerances of parts used to connect outer carrier 134 to the casing, for example, lash in splines used to connect outer carrier 134 and the casing. Note that axial movement of outer carrier 134 with respect to the casing may be possible. In an example embodiment, outer carrier 134 is integral to casing 137.

Actuation assembly 122 includes at least one spring 138. As further described below, for a power failure of the actuator, at least one spring 138 is arranged to close clutch 118. That is, at least one spring 138 enables a fail-safe condition that ensures that at least one gear of the transmission is usable in the event of a failure of the actuator. Stated otherwise, at least one spring 138 is preloaded to provide force F1, for example, in direction D1, and in the absence of force F2, generated by the actuator, for example, in direction D2, opposite direction D1, to counteract F1, at least one spring 138 is arranged to close clutch 118.

In an example embodiment, at least one spring 138 includes springs 140, 142, and 144, and assembly 122 includes plates 146 and 148. Springs 140, 142, and 144 are preloaded so that spring 142 exerts force F1 on plate 148 through spring 144. When portion 150 of the actuator exerts F2 on plate 146, F2 pushes plate 146 and springs 140, 142, and 144 so that the preloading of spring 144 is relieved, spring 144 displaces in direction D2, and force F1 on plate 148 is relieved and clutch 118 can open. In the absence of force F2 from the actuator on spring 140, spring 144 exerts F1 on plate 148, closing clutch 118.

Modes of operation for the transmission are now described. In a first mode, which also can be described as a first position for displaceable portion, or rotor, 150 of the actuator, the actuator is arranged to close clutch 120 so that the ring gear is grounded to the case, and open the clutch 118 so that torque path 152 is formed from input shaft 102 to the output shaft through the planetary gear set and the inner carrier of clutch 118. That is, torque path 152 passes through the planetary gear set. In an example embodiment, the inner carrier of clutch 118 is directly connected to the output shaft by components 154 and 156. In a second mode, which also can be described as a second position for displaceable portion 150 of the actuator, the actuator is arranged to open clutch 120, and close clutch 118 so that torque path 158 is formed from input shaft 104 to the output shaft through the plurality of clutch plates 130. That is, torque path 158 by-passes the planetary gear set.

The following provides further detail regarding an example configuration of clutch assembly 100. As noted above, clutch 118 is normally clamped under pre-load to enable fail safe operation in case of power loss. The actuator assembly provides axial load, for example, F1, on clutch 118 via radially disposed fingers 147 of plate 148 that extend through housing element 160. The fingers are pushed by spring 144, which is pushed by spring 142. F1 is transferred to inner carrier 126 in direction D1 via apply plate 149, plates 130, plate 151, and snap ring 164. To generate F1, spring 142 and 144 push housing element 162 and snap ring 166, respectively in direction D2. Element 162 then pushes on the planet carrier. The attachment to the planet carrier then pulls carrier 126 in direction D2. Thus, force F1 and the reaction force resulting from the action of springs 142 and 144 to generate F1 are balanced within assembly 122, specifically, in carrier 126. Elements 160 and 162 are separate components fixed together after assembly of springs 142 and 144.

Thus, plates 130 are normally clamped under load where all reaction forces are contained within the subassembly. Thus, force F1 and the reaction force are balanced independent of casing 137, enabling assembly 122 to be installed, in the pre-loaded state, within the transmission. In an alternative embodiment, element 160 is fixedly connected to carrier 126 and not to element 162, and spring 142 preloads the subassembly during installation into the transmission.

Spring 144 is a class 2 lever that receives force from spring 142 and pivots on snap ring 166. Thus the force from spring 142 is lower than the force that is transferred to plate 148 by a factor equal to the lever ratio.

Clutch plates 136 are not pre-loaded and remain normally open with the force from the return spring 170. Apply element 172 is located between clutch 120 and plate 146. Element 173 and spring 170 urge plate 172 in direction D1. Plate 146 is pushed by spring 144 on one side, and by spring 140 on the other side. Bearing 174 is installed between plate 146 and spring 144 since there is relative motion between these two components. Spring 140 is a class 2 lever similar to spring 144 above, pivoting at housing 176 to provide a mechanical advantage and increase the elective force F2 from actuator rotor 150 acting against plate 146. Electro-mechanical actuator stator 124 is fixed to casing 137 so that the stator does not rotate and is axially retained in housing 176, disposed within casing 137. Housing 176 reacts to housing element 160 via bearing 178. Actuator 124 operates to close clutch 120 (clamp plates 136) and open clutch 118 (release plates 130), to hand torque over from clutch 118 to clutch 120, that is to switch from torque path 158 to torque path 152.

When actuator 124 is operated, actuator rotor 150 moves axially in direction D2 towards clutch 120 displacing spring 140. Spring 140 then reacts to plate 146 transferring a force that is higher than the apply force, for example, force F2, from rotor 150 by a factor equal to the leverage ratio due to the mechanical advantage. Plate 146 moves axially until a certain amount of lift-off between plate 146 and bearing 174 is closed, and pressure plate 182 contacts plates 136. At this point, the force from the plate 146 is divided between bearing 174 and element 172. The force that is transferred to element 172 increases the clamping load on plates 136, while the force that is transferred to spring 144 by bearing 174 displaces spring 142, reducing the clamping load on plates 130. As spring 144 moves axially away from clutch 118 (direction D2), plates 130 are released. As plate 146 moves axially toward clutch 120, plates 136 are engaged. The force engaging the plates is transmitted through the plates to backing plate 175 and retention element 177 to the easing.

Due to the mechanical advantage on spring 144, a lesser portion of the divided axial force which is provided by plate 146 is needed to release plates 130 and a higher portion of this force is used to clamp plates 136. That is, the preload force from spring 144 is less than the effective clamping force F1 acting on plates 130, so the axial force acting on spring 166 to release clutch 118 is proportional the spring 144 preload force, and less than force F1. Due to the mechanical advantage on the spring 140, the actual force that is provided by the actuator rotor can be less than the sum of the respective clamping and release forces acting on plates 130 and 136.

To generate force F2 to close clutch 120, portion 150 of the actuator pushes spring 140, which pushes plates 172 and 182 to clamp clutch plates 136. The force is then transferred to casing 137 via outer carrier 134. Spring 140 pushes on plate 176 to push plate 146. The force on plate 176 is transferred to casing 137. The force transferred to spring 144 from plate 146 via bearing 174 reacts back to the actuator via bearing 178 in the following manner: spring 144 displaces spring 142 in direction D2, spring 142 is axially retained by element 162, element 162 is axially fixed to element 160, bearing 178 communicates axial forces between element 160 and housing 176, and the actuator is seated against housing 176. The force that is transferred to element 172 similarly reacts back to the actuator via casing 137 as both clutch 120 and the actuator, through housing 176, are contained within casing 137. Therefore, all reaction forces are contained.

When there is a power loss disabling the actuator, components move back to their respective original position under force from spring 142, releasing clutch 120 and clamping clutch 118. This response ensures the fail safe operation of the power transmission unit. That is, a gear is available for operation of the transmission via clutch 118.

Figure 3:
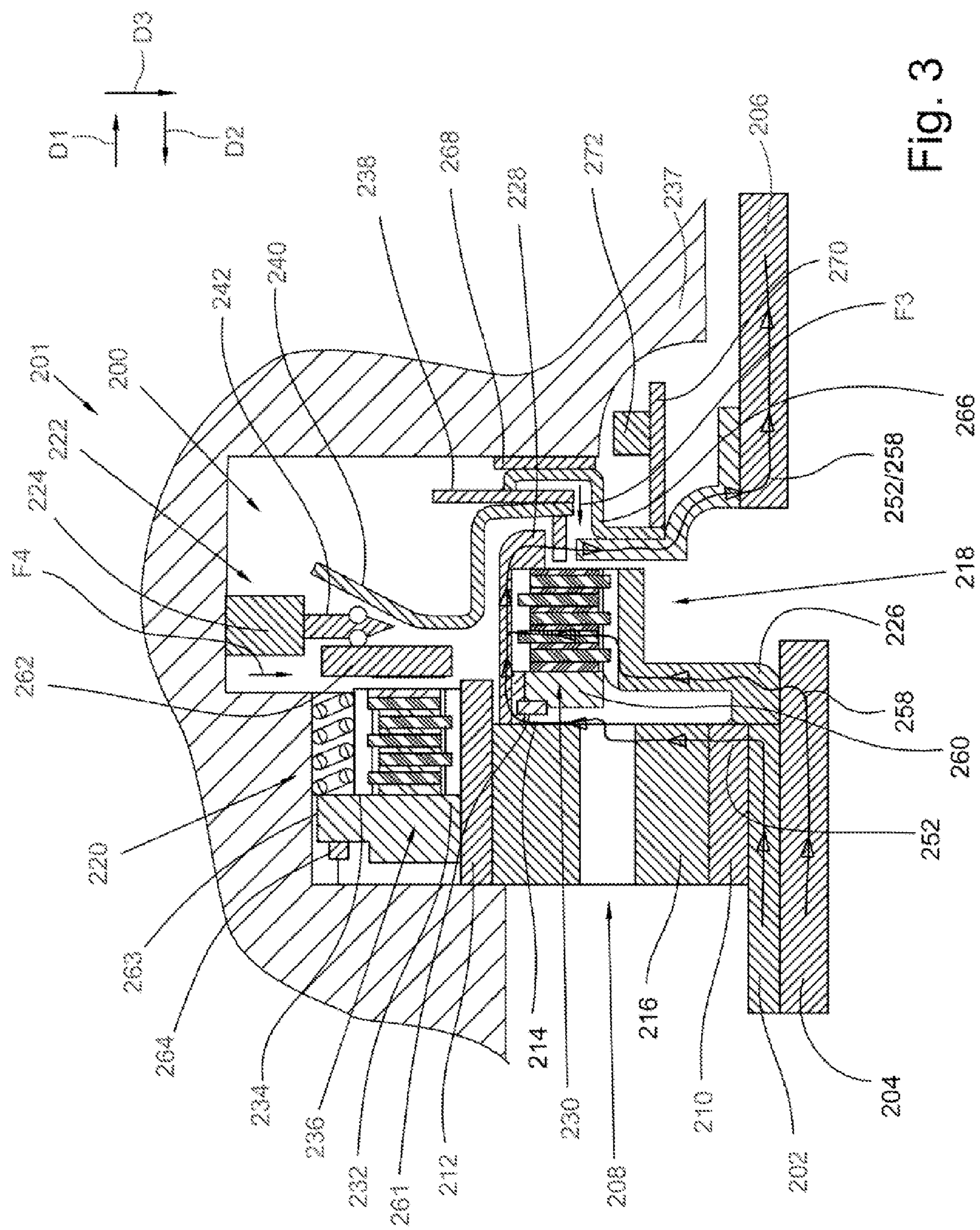
FIG. 3 is a schematic cross-section of a clutch assembly, with a common actuator for two clutches and a fail close clutch, for a transmission.

FIG. 3 is a schematic cross-section of clutch assembly 200, with a common actuator for two clutches and a fail close clutch, for a transmission. Transmission 201 includes input shafts 202 and 204, output shaft 206, and planetary gear set 208. In an example embodiment, gear set 208 includes sun gear 210, ring gear 212, and planet carrier 214 connected to a plurality of planet gears 216. In an example embodiment, the sun gear is connected to input shaft 202 so that the sun gear and input shaft 202 rotate in unison. The clutch assembly includes clutches 218 and 220 and actuation assembly 222 including actuator 224. Actuator 224 can be any actuator known in the art, including, but not limited to an electro-mechanical actuator, a pneumatic actuator, a hydraulic actuator, or a vacuum actuator. In an example embodiment, the actuator is an electro-mechanical actuator.

The planet carrier is connected to clutch 218 so that the planet carrier and at least a portion of the clutch 218 rotate in unison. Clutch 218 is connected to the output shaft. Clutch 218 includes inner carrier 226, outer carrier 228, and a plurality of clutch plates 230 disposed radially between the inner and outer carriers. In an example embodiment, the planet carrier is connected to outer carrier 228 so that the planet carrier and outer carrier 228 rotate in unison.

Clutch 220 includes inner carrier 232, outer carrier 234, and a plurality of clutch plates 236 disposed radially between the inner and outer carriers. In an example embodiment, the ring gear is connected to inner carrier 232 so that the ring gear and inner carrier 232 rotate in unison. In an example embodiment, outer carrier 234 is grounded to casing 237 of the transmission. That is, outer carrier 234 is connected to the casing so that rotation of outer carrier 234 with respect to the casing is not possible except possibly within tolerances of parts used to connect outer carrier 234 to the casing, for example, lash in splines used to connect outer carrier 234 and the casing. Note that axial movement of outer carrier 234 with respect to the casing may be possible. In an example embodiment, outer carrier 234 is integral to casing 237.

The actuation assembly includes spring 238. As further described below, for a power failure of the actuator, spring 238 is arranged to close clutch 218. That is, spring 238 enables a fail-safe condition that ensures that at least one gear of the transmission is usable in the event of a failure of the actuator. Stated otherwise, spring 238 is preloaded to provide force F3, for example, in direction D2, and in the absence of force F4, generated by the actuator, for example, in direction D3, to counteract F3, spring 238 is arranged to close clutch 218.

In an example embodiment, assembly 222 includes transfer plate 240 and separating element 242. When the actuator exerts F4 on element 242, element 242 displaces in direction D3, urging plate 240 in direction D1. Plate 240 urges spring 238 in direction D1, counteracting the preload, for example, F3, opening clutch 218. In the absence of force F3 from the actuator, spring 238 exerts F3 on plate 240, closing clutch 218.

Modes of operation, or configurations, for the transmission are now described. In a first mode, which also can be described as a first position for a displaceable portion of the actuator, that is, the portion of the actuator moving the separating element, the actuator is arranged to close clutch 220 so that the ring gear is grounded to the case, and open clutch 218 so that torque path 252 is formed from input shaft 202 to the output shaft through the planetary gear set and the outer carrier of clutch 218. That is, torque path 252 passes through the planetary gear set. In a second mode, which also can be described as a second position for the displaceable portion of the actuator, the actuator is arranged to open clutch 220, and close clutch 218 so that torque path 258 is formed from input shaft 204 to the output shaft through the plurality of clutch plates 230. That is, torque path 258 by-passes the planetary gear set.

The following provides further detail regarding an example configuration of clutch assembly 200. Clutch 218 is normally closed for fail safe operation in case of power loss to actuator 224. To close clutch 218, for example, for fail safe operation, forces associated with operation of the actuator and the clutches are fully self contained with the transmission. Force, for example, F3, from spring 238 is applied to plates 230 via plate 240. Force from spring 238 pushes on backing plate 260 and is transmitted via retaining element 261 to outer carrier 228. To generate force F3, spring 238 pushes against load retaining plate 266 which is connected to outer carrier 228 by any means known in the art. Plate 266 and carrier 228 may be connected, for example, by a rivet or by welding. Thus, force F3 and the reaction force resulting from the action of spring 238 to generate F3 are balanced within assembly 222, specifically, in carrier 228. Stated otherwise, force F3 and the reaction force generated by force F3 are balanced independent of casing 237, enabling assembly 222 to be installed, in the pre-loaded state, within the transmission.

Clutch 220 is normally open to allow torque transfer though plates 230 in default mode. Clutch 220 is loaded with plate 240 and spring 238. Clutch 220 is closed by increasing the distance between loading plate 262 and plate 240 with separating element 242. Thus, the load of spring 238 is applied through plate 240 to plates 236 via separating element 242 and plate 262. Plates 236 are supported by backing plate 263 and retaining feature 264 connected to casing 237. Spring 238 pushes off of plate 266 to close clutch 220. Force from this push is transmitted to casing 237 via load retaining plate 266 and thrust element 268. Thrust element 268 may be a bearing or a bushing, for example. During the preceding action, load into plates 230 is reduced while load on plates 236 is increased resulting in torque transfer from torque path 258 to torque path 252. Spring 238 increases load during initial transfer, enabling increased total torque transfer capabilities of combined clutches 218 and 220 during torque handoff. That is, as plate 240 displaces spring 238, the reaction force from spring 238 is increased, thus maintaining adequate force to keep clutch 218 closed as well as increasing force to begin closing clutch 220. When clutch 220 is closed, clutch 220 locks, or grounds, the ring gear; therefore, transferring torque from clutch 218 to clutch 220 and into the output shaft. Ring 270 may be a tone wheel used in conjunction with a transmission sensor to measure position and/or speed of the output shaft, while parking ring 272 may be used in conjunction with a park pawl to enable complete system locking by rotationally fixing the output shaft to the transmission case.

Figure 4:
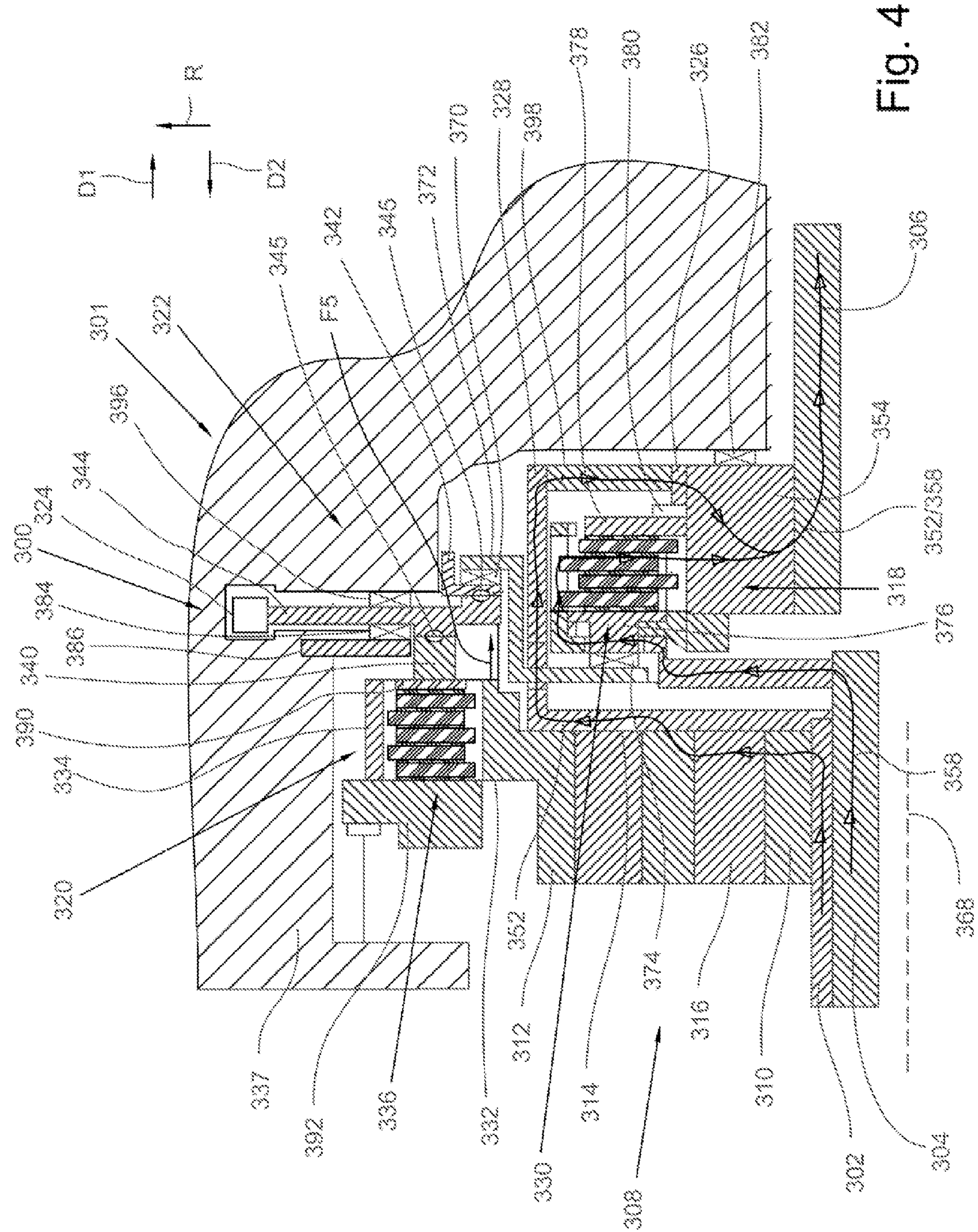
FIG. 4 is a schematic cross-section of a clutch assembly, with a common actuator for two clutches and a fail close clutch, for a transmission; and, FIG. 5 is a schematic plan view of the three discs shown in FIG. 4.

FIG. 4 is a schematic cross-section of clutch assembly 300, with a common actuator for two clutches and a fail close clutch, for a transmission.

Figure 5:
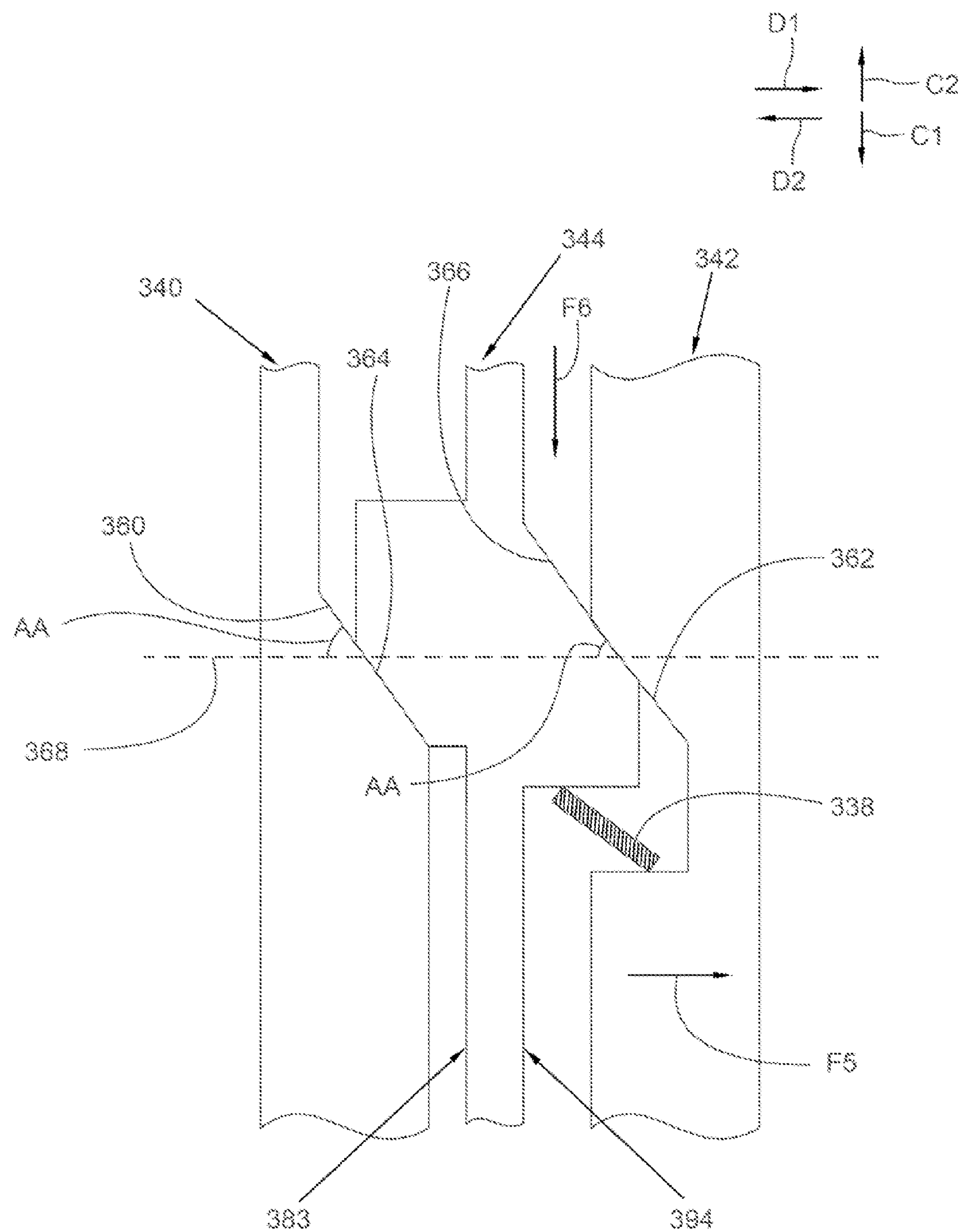

FIG. 5 is a schematic plan view of the three discs shown in FIG. 4. The following should be viewed in light of FIGS. 4 and 5. Transmission 301 includes input shafts 302 and 304, output shaft 306, and planetary gear set 308. In an example embodiment, gear set 308 includes sun gear 310, ring gear 312, and planet carrier 314 connected to a plurality of planet gears 316. In an example embodiment, the sun gear is connected to input shaft 302 so that the sun gear and input shaft 302 rotate in unison. The clutch assembly includes clutches 318 and 320 and actuation assembly 322 including actuator 324. Actuator 324 can be any actuator known in the art, including, but not limited to an electro-mechanical actuator, a pneumatic actuator, a hydraulic actuator, or a vacuum actuator. In an example embodiment, the actuator is an electromechanical actuator.

The planet carrier is connected to clutch 318 so that the planet carrier and at least a portion of the clutch 318 rotate in unison. Clutch 318 is connected to the output shaft. Clutch 318 includes inner carrier 326, outer carrier 328, and a plurality of clutch plates 330 disposed radially between the inner and outer carriers. In an example embodiment, the planet carrier is connected to inner carrier 326 so that the planet carrier and inner carrier 326 rotate in unison.

Clutch 320 includes inner carrier 332, outer carrier 334, and a plurality of clutch plates 336 disposed radially between the inner and outer carriers. In an example embodiment, the ring gear is connected to inner carrier 332 so that the ring gear and inner carrier 332 rotate in unison. In an example embodiment, outer carrier 334 is grounded to casing 337 of the transmission. That is, outer carrier 334 is connected to the casing so that rotation of outer carrier 334 with respect to the casing is not possible except possibly within tolerances of parts used to connect outer carrier 334 to the casing, for example, lash in splines used to connect outer carrier 334 and the casing. Note that axial movement of outer carrier 334 with respect to the casing may be possible. In an example embodiment, outer carrier 334 is integral to casing 337.

Actuation assembly includes spring 338. As further described below, for a power failure of the actuator, spring 338 is arranged to close clutch 318. That is, spring 338 enables a fail-safe condition that ensures that at least one gear of the transmission is usable in the event of a failure of the actuator. Stated otherwise and as further described below, spring 338 is preloaded to provide force F5, for example, in axial direction D1, and in the absence of force F6, generated by the actuator, for example, in direction C1, to counteract F5, spring 338 is arranged to close clutch 318.

In an example embodiment, assembly 322 includes discs 340 and 342, and wedge disc 344 axially disposed between discs 340 and 342. In an example embodiment shown in FIG. 4, assembly 322 includes optional rolling elements 345 to reduce sliding friction between the discs. For the sake of clarity, the rolling elements are not shown in FIG. 5. Discs 340 and 342 are circumferentially fixed and axially displaceable. Disc 344 is axially fixed and circumferentially displaceable. Spring 338 is preloaded so that the spring urges disc 342 in direction C1 and disc 344 is direction C2, resulting in force F5 on disc 342 in direction D1, as further described below. As further described below, when the actuator rotates disc 344 in direction C1 to exert F6 and displace spring 338, disc 344 moves out of engagement with disc 342, eliminating force F5 such clutch 318 can open. In the absence of force F6 from the actuator on spring 338, spring 338 urges disc 344 against disc 342 as noted above, generating force F5 on disc 342, closing clutch 318.

Modes of operation, or configurations, for the transmission are now described. In a first mode, which also can be described as a first position for a displaceable portion of the actuator, that is, the portion of the actuator moving disc 344, the actuator is arranged to close clutch 320 so that the ring gear is grounded to the case, and open clutch 318 so that torque path 352 is formed from input shaft 302 to the output shaft through the planetary gear set and the inner carrier of clutch 318. That is, torque path 352 passes through the planetary gear set. In an example embodiment, the inner carrier of clutch 318 is directly connected to the output shaft by component 354. In a second mode, which also can be described as a second position for the displaceable portion of the actuator, the actuator is arranged to open clutch 320, and close clutch 318 so that torque path 358 is formed from input shaft 304 to the output shaft through the plurality of clutch plates 330. That is, torque path 358 by-passes the planetary gear set.

The following provides further detail regarding an example configuration of clutch assembly 300. Discs 340 and 342 include one or more ramp surfaces 360 and 362, respectively, and disc 344 includes one or more ramp surfaces 364 and 366, facing the ramp surfaces 360 and 362, respectively. The actuator displaces disc 344 is direction C1 to engage surfaces 360 and 364. Since disc 340 is circumferentially fixed, disc 340 reacts to the engagement of the surfaces by displacing in direction D2, for example, to close clutch 320. The actuator displaces disc 344 is direction C2 to engage surfaces 362 and 366. Since disc 342 is circumferentially fixed, disc 342 reacts to the engagement of the surfaces by displacing in direction D1, for example, to close clutch 318 or to increase clamping force on clutch 318. Surfaces 360, 362, 364, and 366 are orthogonal to axis of rotation 368 for disc 344 in radial direction R (out of the page in FIG. 5), and are at respective acute angles AA with respect to the axis of rotation in axial direction D1 or D2.

For a power failure of the actuator, disc 344 is arranged to be circumferentially fixed, and spring 338 is arranged to displace disc 342 in direction C1 to displace disc 342 in direction D1 to close clutch 318; or disc 344 is circumferentially displaceable and spring 338 is arranged to displace disc 342 in direction C1 and to displace disc 344 in direction C2 to displace disc 342 in direction D1 to close clutch 318.

Wedge disc 344 is rotated with actuator 324 in a clockwise direction, C1, or in a counterclockwise direction, C2. In the starting, default, or fail-safe condition, clutch 318 is locked via force F5, clamping plates 330. The axial farce path that clamps plates 330 is as follows: from ramp 366 to ramp 362, from disc 342 to thrust element 370, from element 370 to plate 372, and from plate 372 to thrust element 374, apply plate 376, and plates 330. The force path continues from plates 330 to axial retaining features 378 and 380, from features 378 and 380 to inner carrier 326, from carrier 326 to thrust element 382 and the transmission casing. To generate the axial force, side 383 of disk 344 pushes against thrust element 384 which pushes against retaining feature 386, which is fixed to casing 337.

Torque path 358 for plates 330 is as follows. Torque in introduced from input shaft 304 to outer carrier 328 and is transmitted to output shaft 306 via plates 330 and inner carrier 326.

The transition between the engagement of plates 336 and the disengagement of plates 330 is as follows. Note that clutch 318 is closed at the start of this sequence. Input shafts 302 and 304 are rotated at speeds that minimize the relative motion at the respective clutch plate interfaces for clutches 318 and 320. Wedge plate 344 is rotated clockwise, direction C1, to start the engagement of plates 336. Plates 330 are not initially unlocked immediately as plates 336 begin to be engaged by axial displacement of disc 340. After a predetermine amount of torque is being transmitted through plates 336, plates 330 are completely disengaged, resulting in torque transmission through clutch 320.

The axial force path that locks plates 336 is as follows: from ramp 364 to ramp 360, from disc 340 to apply plate 390 to plates 336, from plates 336 to element 392 to the transmission casing. To generate the axial force, side 394 of disc 344 pushes against thrust element 396, which pushes against casing 337. Torque path 352 for plates 336 is as follows: torque is introduced to sun gear 310 from input shaft 302. The torque is transmitted from the sun gear to the planet carrier. Since clutch 320 is closed, the ring gear is grounded to the transmission casing, and torque is transmitted from the planet carrier to torque plate 398. Torque is then transmitted from plate 398 to inner carrier 326 to the output shaft.

Although clutch assemblies 100, 200, and 300 have been shown with respective configurations of components, it should be understood that assemblies 100, 200, and 300 are not limited to the respective configurations of components shown and that other respective configurations of components are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A clutch assembly for a transmission, comprising:
first and second clutches; and,
an actuation assembly including:
an actuator; and,
at least one spring, wherein:
the first clutch is arranged to be connected to a planet carrier for a planetary gear set for the transmission so that the planet carrier and a first portion of the first clutch rotate in unison;
the first clutch is arranged to be connected to an output shaft for the transmission so that the first portion of the first clutch and the output shaft rotate in unison;
the first clutch is arranged to be connected to a first input shaft for the transmission so that the first input shaft and a second portion of the first clutch rotate in unison;
the second clutch is arranged to be connected to a ring gear for the planetary gear set so that the ring gear and a portion of the second clutch rotate in unison;
when the second clutch is closed:
rotation of the ring gear is blocked; and,
when a second input shaft for the transmission, connected to the planetary gear set, rotates, the planet carrier and the first portion also rotate; and,
for a power failure of the actuator, the at least one spring is arranged to close the first clutch.

2. The clutch assembly of claim 1, wherein:
the portion of the first clutch includes an inner carrier;
the first clutch includes an outer carrier;
a plurality of clutch plates disposed radially between the inner and outer carriers;
in a first mode the actuator is arranged to:
close the second clutch so that the ring gear is grounded to a case for the transmission; and,
open the first clutch so that a first torque path is formed from a first input shaft for the transmission to the output shaft through the planetary gear set and the inner or outer carrier of the first clutch; and,
in a second mode the actuator is arranged to:
open the second clutch; and,
close the first clutch so that a second torque path is formed from a second input shaft for the transmission to the output shaft through the plurality of clutch plates.

3. The clutch assembly of claim 1, wherein:
the at least one spring includes first and second springs;
the first spring is arranged to apply a first force to the first clutch to close the first clutch;
the second spring is arranged to generate a second force in reaction to applying the first force; and,
the first and second forces are balanced within the actuation assembly.

4. The clutch assembly of claim 1, wherein:
the actuation assembly includes a plate;
the at least one spring includes first and second springs;
a portion of the actuator is arranged to axially displace at least a portion of the first spring from the plurality of springs; and,
the first spring displaces the plate to:
close the second clutch; and,
displace the second spring to open the first clutch.

5. The clutch assembly of claim 1, wherein the first and second clutches are arranged to be simultaneously closed.

6. A clutch assembly for a transmission, comprising:
a first clutch arranged to be connected to a planetary gear set for the transmission and to a first input shaft for the transmission and including a first plurality of clutch plates;
a second clutch arranged to be connected to the planetary gear set; and,
an actuation assembly including at least one spring, and an actuator with a displaceable portion for engaging the first and second clutches, wherein:
in a first position for the displaceable portion of the actuator:
pre-loading of the at least one spring creates a first force urging the first clutch closed;
the second clutch is open; and,
a first torque path is formed from the first input shaft to an output shaft for the transmission through the first plurality of clutch plates; and,
in a second position for the displaceable portion of the actuator:
the displaceable portion is arranged to:
close the second clutch; and,
displace at least a portion of the at least one spring to counteract the first force to open the first clutch; and,
a second torque path is formed from a second input shaft for the transmission to the output shaft via the planetary gear set and a portion of the first clutch.

7. The clutch assembly of claim 6, wherein:
the at least one spring includes first and second springs;
the actuation assembly includes a plate;
the displaceable portion of the actuator is arranged to axially displace at least a portion of the first spring; and,
the displacement of the first spring is arranged to displace the plate to:
close the second clutch; and,
displace the second spring to open the first clutch.

8. The clutch assembly of claim 7, wherein:
the first clutch includes an inner carrier arranged to be connected to the planetary gear set;
the first spring is arranged to apply a first force to the first clutch to close the first clutch;

to generate the first force, the second spring is arranged to push off of at least one component of the clutch assembly thereby generating a second force; and, the first and second forces are balanced in the inner carrier.

9. A clutch assembly for a transmission, comprising:

first and second clutches; and, an actuation assembly including an actuator for engaging the first and second clutches, a plate, and first and second and third springs, wherein:

the first clutch is arranged to be connected to a planet carrier for a planetary gear set for the transmission so that the planet carrier and a first portion of the first clutch rotate in unison;

the first clutch is arranged to be connected to an output shaft for the transmission so that the output shaft and the first portion of the first clutch rotate in unison;

the second clutch is arranged to be connected to a ring gear for the planetary gear set so that the ring gear and a portion of the second clutch rotate in unison;

in a first mode, a portion of the actuator is arranged to axially displace at least a portion of the first spring in a first axial direction such that the displacement of the first spring displaces the plate to:

close the second clutch; and, displace the second and third springs to open the first clutch; and, in a second mode, a portion of the actuator is arranged to axially displace to enable displacement of the first spring in a second axial direction, opposite the first axial direction:

to open the second clutch; and, such that the second and third springs closes the first clutch.

* * * * *